INVENTOR
DONALD G. RADKE
FREDERICK C. BOOTH
BY
ATTORNEYS

Nov. 5, 1968    D. G. RADKE ETAL    3,409,327
SEAT BELT WITH ENERGY ABSORBING SLEEVE
Filed June 15, 1967    2 Sheets-Sheet 2
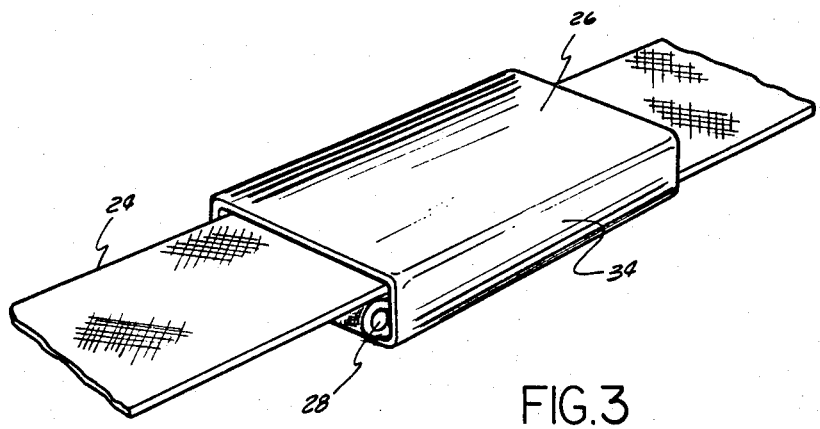
FIG.3
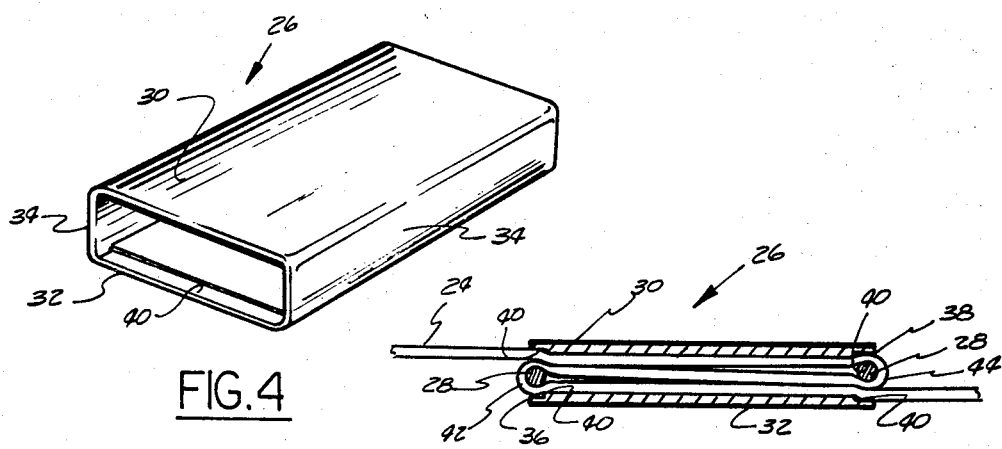
FIG.4
FIG.5
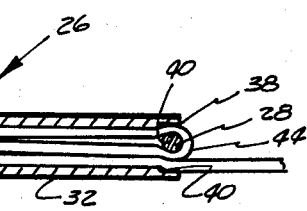
FIG.6
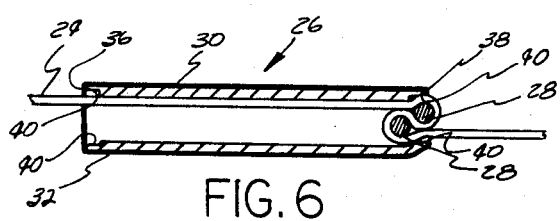
FIG.7
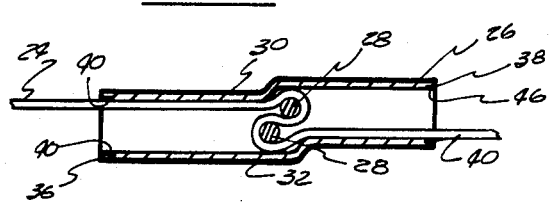
INVENTOR
DONALD G. RADKE
FREDERICK C. BOOTH
BY
Hauke, Kraus & Gifford
ATTORNEYS.

3,409,327
SEAT BELT WITH ENERGY ABSORBING SLEEVE
Donald G. Radke, Troy, and Frederick C. Booth, Birmingham, Mich., assignors to Jim Robbins Seat Belt Co., Royal Oak, Mich.,
Filed June 15, 1967, Ser. No. 646,342
6 Claims. (Cl. 297—386)

ABSTRACT OF THE DISCLOSURE

A section of seat belt webbing having overlapping portions formed by a pair of spaced apart transverse folds. The overlapping sections are arranged within an elongated plastic sleeve with the folds adjacent the opposite ends of the sleeve. A roller member disposed within each of the folds normally prevents the webbing from unfolding under normal tensile forces. When a predetermined tensile force is applied to the webbing, the walls of the sleeve enlarge so that the roller members can approach one another with the webbing unfolding at a controlled rate to provide a cushioned restraining force on the occupant of the seat belt system.

Background of the invention (1) Field of the invention.—This invention is related to vehicle safety seat belt assemblies and more specifically to a deformable sleeve member for a longitudinally folded section of webbing which normally prevents unfolding when a normal tensile force is applied to the webbing, but which enlarges when an abnormal force is applied to the webbing so that the webbing gradually elongates to provide the occupant with a gradual deceleration when the vehicle experiences an abrupt deceleration.

(2) Description of the prior art.—Vehicle safety seat belt assemblies are normally designed to restrict the displacement of an occupant with respect to his seated position when the vehicle experiences a sudden and violent deceleration. The object of such seat belt systems is to prevent the occupant from continuing in the direction of the former travel of the vehicle until he is stopped by relatively unyielding injury producing surfaces of the passenger compartment.

Crash studies have indicated that a secondary problem results when the occupant has both lap and shoulder belt restraints. After the initial vehicle impact the occupant tends to move forward until the slack in the belts has been taken up sufficiently to develop an effective restraining force. The relatively unyielding belt then causes the occupant to snap back toward his original position where he often experiences neck and back injuries as he comes into contact with the back structure of the seat assembly. In addition, this rebound effect often snaps the occupant of a forward seat of the car rearwardly in the path of the forward movement of an unrestrained occupant of the rear seat. The two occupants moving in opposite diections then come into injury-producing contact with one another.

The broad purpose of the present invention is to provide a device for a section of seat belt webbing which forms an upper torso restraint and is constructed to absorb the kinetic energy of the occupant as he is displaced away from his seated position when the vehicle experiences a sudden deceleration and which eliminates the rebound effect of conventional shoulder harness assemblies.

Summary

The preferred embodiment of the present invention, which will be subsequently described in greater detail, takes the form of a plastic sleeve having a generally rectangular interior cross-section. The long dimension of the interior cross-section is slightly greater than the width of a section of webbing. The webbing is formed into overlapping sections by a pair of spaced transverse folds arranged such that the webbing extends in opposite directions from the folded sections. The overlapping webbing sections are arranged within the plastic sleeve with the folds disposed adjacent the open ends of the sleeve. A metal pin or roller member carried within each of the folds has a diameter such that the diameter of the pin combined with the thickness of the folded sections is greater than the distance between the upper and lower walls of the sleeve thereby preventing the pins from approaching one another so that the belt cannot unfold when a normal tensile force is applied to the webbing. The walls of the sleeve have a predetermined lateral strength so that when a predetermined force is applied to opposite ends of the webbing, the walls of the sleeve are laterally enlarged by the pins so that they can approach one another thereby permitting the webbing to gradually unfold.

By combining the preferred sleeve and pins with a section of webbing forming a shoulder harness assembly, the webbing has an initial fixed length when normal restraining forces are applied by the shoulder harness on the occupant. However, when sudden violent forces tend to displace the occupant from his seated position forwardly, the restraining forces applied by the webbing on the occupant are built up gradually with his forward kinetic energy being absorbed in the work of deforming the walls of the sleeve so that he experiences a cushioned deceleration. Preferably the folded sections of the belt provide a total extension of about six inches so that the occupant gradually decelerates to a dead stop without any rebound. The sleeve preferably has a uniform longitudinal cross-section with the walls arranged to commence deforming when a 700 pound force is applied to the webbing.

It is therefore an object of the present invention to provide an energy absorbing device for a vehicle safety seat belt assembly which retains a section of webbing in a partially folded condition under normal restraining forces, but deforms when a predetermined restraining force is applied to the webbing to permit the webbing to gradually elongate from an initial folded length.

It is another object of the present invention to improve vehicle safety seat belt assemblies by providing a sleeve for enclosing a section of webbing having folds which are disposed adjacent the opposite ends of the sleeve, and with a roller member disposed within each of the folds having a diameter such that the roller members cannot approach one another under normal tensile forces, the sleeve having wall sections which deform laterally outwardly to allow the roller members to approach one another so that the webbing gradually unfolds when a predetermined tensile force is applied to the webbing.

A still further object of the present invention is to provide a relatively simple device which can be attached to a section of webbing forming a shoulder harness assembly and permits the belt to elongate at a controlled rate when a predetermined restraining force is applied by the shoulder harness upon an occupant.

A still further object of the present invention is to provide a safety seat belt assembly having a section of webbing forming a shoulder harness and a device for retaining a section of the webbing in a partially folded condition, the device permitting the webbing to gradually unfold under the influence of a predetermined restraining force so that the occupant does not experience a rebound after experiencing a sudden displacement away from his seated position.

Still further objects and advantages of the present invention will readily occur to one skilled in the art to which this invention pertains upon reference to the following detailed description.

Description of the drawings

The description refers to the accompanying drawings in which like reference characters refer to like parts throughout the several views and in which:

FIGURE 3 is an enlarged view of the preferred sleeve maintaining the webbing in a partially folded condition;

FIGURE 4 is a perspective view of the sleeve illustrated in FIGURE 3 separated from the webbing;

FIGURE 5 is a longitudinal cross-sectional view of the sleeve and webbing of FIGURE 3;

FIGURE 6 is a view similar to FIGURE 5 but showing the webbing substantially unfolded with one of the pins having traveled the full length of the sleeve toward the opposite pin; and FIGURE 7 is a view similar to FIGURE 5 but illustrating how both of the pins have approached one another to substantially unfold the webbing.

Description of the preferred embodiment

Figure 1:
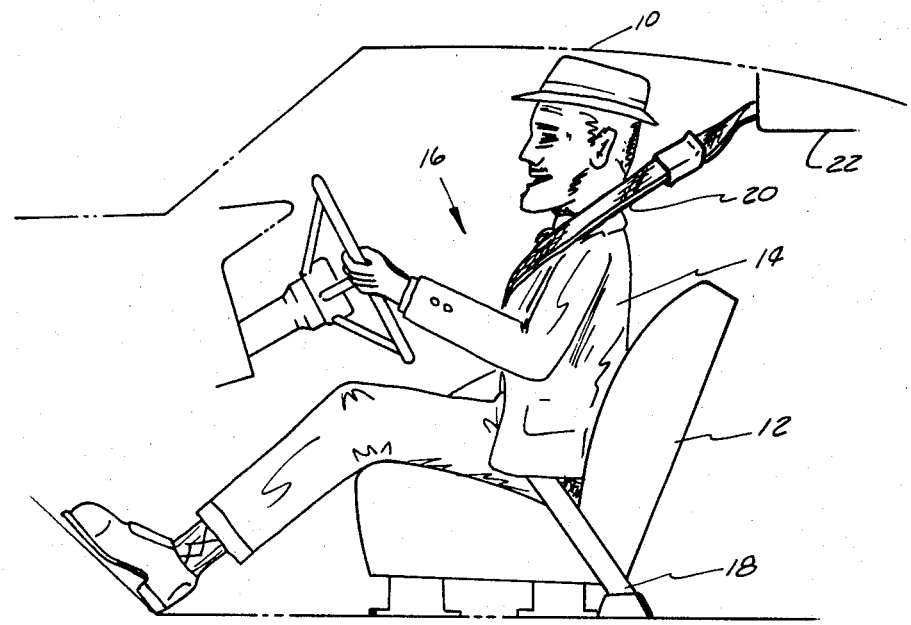
FIGURE 1 is a schematic view of a vehicle and an occupant with a lap and shoulder belt assembly illustrating the preferred embodiment of the invention before the vehicle experiences a sudden deceleration.

Now referring to the drawings, FIGURE 1 illustrates a vehicle 10 having a seat assembly 12 with an occupant 14 seated in the seat assembly 12. A vehicle safety seat belt assembly 16 having a lap section 18 and a shoulder harness section 20 is adapted to control the movement of the occupant 14 with respect to his seated position. The lap belt section 18 is of the conventional type preferably formed of a pair of halves having their lower ends anchored to the vehicle and with their upper coupled ends partially embracing the occupant 14 and is preferably connected to the shoulder harness assembly 20 through a releasable buckle connection (not shown).

The upper end of the shoulder harness assembly 20 is preferably attached to an overhead portion of the vehicle by an automatic locking retracting device 22 which is of the type that automatically locks the shoulder harness 20 to the vehicle 10 when the webbing commences to extend from a stored position at an abnormal rate such as is produced by the occupant 14 suddenly shifting forward from his seat at an abnormal velocity. The particular construction of the retractor 22 does not form the material part of the present invention other than that it provides a fixed connection between the shoulder harness 20 and the vehicle 10 when the occupant 14 is suddenly displaced forwardly.

As best seen in FIGURE 3, the shoulder harness assembly 20 has an intermediate section of webbing 24 normally maintained in a partially folded condition by an elongated, plastic sleeve member 26 and a pair of metal pins or roller members 28. As best can be seen in FIGURE 4, the sleeve member 26 has an upper plate section 30 and a lower plate section 32 connected together along their lateral sides by side wall sections 34. The upper and lower plate sections 30 and 32 and the side wall section 34 form a generally rectangular interior cross-section having opposite open ends 36 and 38.

The sleeve 26 is preferably formed of a plastic material having a uniform transverse cross-section extending between its opposite open ends. The upper and lower plate sections 30 and 32 are thinned adjacent the open ends as at 40 so that the webbing 24 can be folded into a series of overlapping sections by transverse folds 42 and 44 which are arranged adjacent the open ends 36 and 38 with the pins 28 retained in position by the thinned sections 40 which function as a pocket for the folded sections 42 and 44 and the pins. The upper and lower plate sections 30 and 32 are spaced a distance less than the combined thickness of the overlapping sections of the belt and the diameter of the pins 28. Thus the upper and lower plate sections 30 and 32 provide an interference path which normally prevents the movement of the pins into the sleeve when a tensile force less than a predetermined force is applied to the webbing 24.

When a predetermined tensile force is applied to the webbing 24, one or both of the pins 28 commence to enter within the sleeve 26 so that the webbing 24 gradually unfolds. As the pins and the folded section of the webbing are pulled through the sleeve 26, the plate sections 30 and 32 are deformed outwardly in a direction perpendicular to the movement of the pins so that the sleeve enlarges sufficiently to permit passage of the pins 28.

As best seen in FIGURE 6, the movement of the pins through the sleeve 26 can take the form of one pin retaining its position adjacent one open end of the sleeve with the companion pin moving toward the stationary pin. Referring to FIGURE 7, both pins can be displaced from their respective sleeve ends toward one another. In either case, the result is the same, that is the webbing section 24 gradually unfolds and with the sleeve being plastically enlarged as the pins approach one another.

Figure 2:
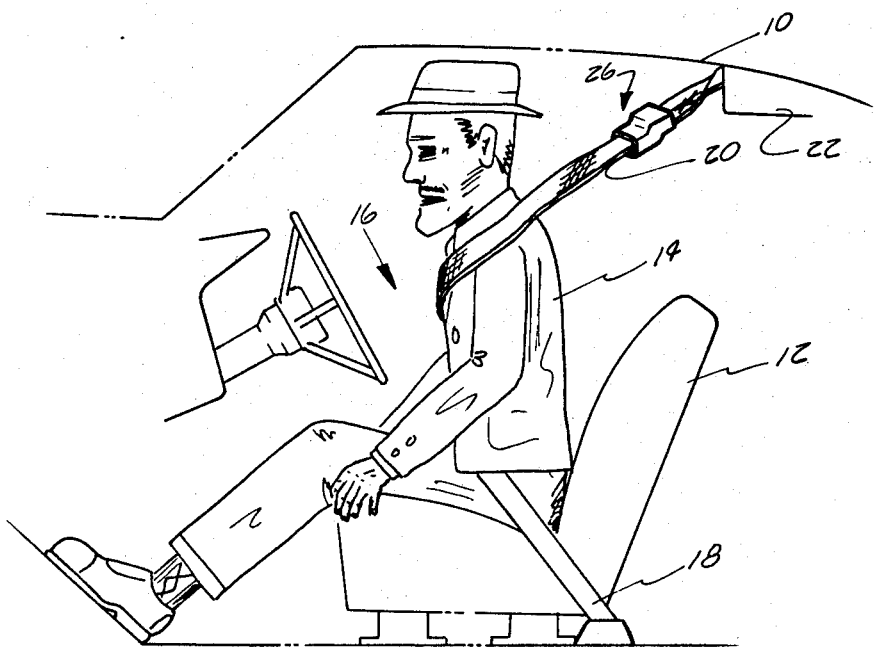
FIGURE 2 is a view similar to FIGURE 1, showing the occupant gradually decelerating after the vehicle has experienced a sudden deceleration.

Referring to FIGURE 2, the occupant 14 is illustrated as being displaced forward from the seat 12 with the shoulder harness section 20 gradually elongating as the folded section of the webbing 24 is unfolded. As the occupant 14 is displaced forwardly, his kinetic energy is absorbed in the work of deforming the sleeve 26 so that at the end of his forward movement the occupant comes to a gradual stop without any rebound.

Preferably the folded sections of webbing and the sleeve are formed such that the shoulder harness 20 has six inches of controlled elongation, the elongation being initiated by the application of a 700 pound restraining force applied on the harness by the occupant 14.

The sleeve 26 is formed of a lightweight plastic material out of a one piece tubular section, with the pins 28 being formed of a metal rod, however, the sleeve 26 could as well be formed of any suitable lightweight, inexpensive material with the wall sections 30 and 32 having a thickness such that they can be deformed laterally outwardly to permit the passage of the pins and the folded sections of the webbing 24 upon the application of the predetermined tensile force on the webbing.

Although we have described our invention in its simplest terms, it is to be understood that various changes and revisions can be made therein without departing from the spirit of the invention as expressed in the scope of the appended claims.

Having thus described our invention, we claim:

1. In a vehicle safety seat belt assembly, an elongated section of webbing having longitudinally overlapping sections formed by a pair of longitudinally spaced transverse folds; a roller member having a predetermined diameter disposed within each of said folds; a tubular member forming a sleeve for said overlapping sections with one of said roller members normally being disposed adjacent one end of said sleeve and the second of said roller members being disposed adjacent the opposite end of said sleeve, said sleeve having a pair of overlapping plate sections, spaced from one another to define an interference path to the movement of said folds and said roller members toward one another when a tensile force is applied to said section of webbing, and at least one of said overlapping plate sections being laterally outwardly deformable when a predetermined lateral force is applied to said deformable plate section by said roller members so that said sleeve prevents said overlapping webbing sections from unfolding when a tensile force less than a predetermined force is applied to said webbing section, but the deformable plate section of said sleeve permits relative movement between said roller members so that said overlapping webbing sections unfold when said predetermined tensile force is applied to said webbing.

2. The invention as defined in claim 1, wherein said deformable plate section has a generally uniform cross-section between the spaced positions of said roller members so that when said roller members approach one another under the influence of said predetermined force, said webbing unfolds at a controlled energy absorbing rate.

3. The invention as defined in claim 1, wherein said sleeve comprises a one piece tubular section having a generally uniform cross-section in the direction of movement of said roller members as they approach one another under the influence of said predetermined tensile force.

4. The invention as defined in claim 1, wherein the overlapping plate sections of said sleeve are spaced from one another a distance less than the combined distance of three times the thickness of said webbing and the diameter of said roller members.

5. The invention as defined in claim 4, wherein each of said roller members comprises a cylindrical pin having a length generally corresponding to the width of said webbing.

6. The invention as defined in claim 1, wherein said overlapping plate sections have reduced portions adjacent each end of said sleeve to provide a seat for said pins and said folds.

References Cited

UNITED STATES PATENTS

| | | |
|---|---|---|
| 3,074,760 | 1/1963 | Hodgekin. |
| 3,302,973 | 2/1967 | Ravau. |
| 3,308,908 | 3/1967 | Bunn _____ 297—386 |
| 3,361,475 | 1/1968 | Villiers. |

JAMES T. McCALL, *Primary Examiner.*